United States Patent
Bromley et al.

(10) Patent No.: US 8,197,922 B2
(45) Date of Patent: Jun. 12, 2012

(54) FLEXLOCK WITH HEADED PINTLE AND CONICAL BUTTRESSING

(75) Inventors: Robert L. Bromley, Centennial, CO (US); Gregory W. O'Connor, Littleton, CO (US)

(73) Assignee: Samsonite IP Holdings S.a.r.l., Luxembourg (LU)

( * ) Notice: Subject to any disclaimer, the term of this patent is extended or adjusted under 35 U.S.C. 154(b) by 0 days.

(21) Appl. No.: 12/898,532

(22) Filed: Oct. 5, 2010

(65) Prior Publication Data

US 2011/0076429 A1 Mar. 31, 2011

Related U.S. Application Data

(60) Continuation of application No. 12/022,110, filed on Jan. 29, 2008, now Pat. No. 7,807,247, and a continuation-in-part of application No. 10/373,423, filed on Feb. 24, 2003, now Pat. No. 7,972,549, which is a division of application No. 09/677,047, filed on Sep. 29, 2000, now abandoned, said application No. 10/373,423 is a continuation-in-part of application No. 10/491,923, filed as application No. PCT/US01/44478 on Nov. 28, 2001, now Pat. No. 7,527,845.

(60) Provisional application No. 60/898,223, filed on Jan. 29, 2007, provisional application No. 60/162,344, filed on Oct. 29, 1999, provisional application No. 60/286,909, filed on Apr. 27, 2001, provisional application No. 60/253,649, filed on Nov. 28, 2000.

(51) Int. Cl.
*B32B 3/10* (2006.01)

(52) U.S. Cl. .......................................... 428/53; 190/124

(58) Field of Classification Search ................... 428/52, 428/53, 33; 190/124; 446/128, 102, 104, 446/108, 114–116, 120, 121, 124; 150/127; 2/2.5; 52/DIG. 1, 81.1
See application file for complete search history.

(56) References Cited

U.S. PATENT DOCUMENTS

| 2,139,512 A | 12/1938 | Nagorny |
| 2,256,645 A | 9/1941 | Kuhlman |
| 2,291,545 A | 7/1942 | Ganz et al. |

(Continued)

FOREIGN PATENT DOCUMENTS

EP 0121433 10/1984

(Continued)

OTHER PUBLICATIONS

Pawloski et al., "Part Performance is Improved Via Solid-Phase Forming," Modern Plastics, Dec. 1985.

(Continued)

*Primary Examiner* — Alexander Thomas
(74) *Attorney, Agent, or Firm* — Dorsey & Whitney LLP (57) ABSTRACT

Flexlock non-textile fabrics use intimately linked elements that are formed from formable, preferably solid phase forgeable materials into generally triangular shapes with hinging connection features along edges of a generally triangular overall shape. These hinging connection portions permit other elements to rotate about axes that intersect at intersections. Buttressing portions are located near these intersections and include cylindrical or conical shapes that abut the buttressing portions of adjacent formed elements. This abutting can occur even when adjacent elements are rotated or twisted out of a common plane. Connection portions include direct formed engagements with knuckles of the other elements. These connection portions and the engaged knuckles can include headed pintles, axles, or oppositely facing conical protrusions, and may be configured to permit the non-textile fabric to bend on itself within its own thickness without undue strain on the connection features.

4 Claims, 10 Drawing Sheets

U.S. PATENT DOCUMENTS

| | | | |
|---|---|---|---|
| 2,335,222 A | 11/1943 | Storch |
| 2,354,485 A | 7/1944 | Slaughter |
| 2,366,274 A | 1/1945 | Luth et al. |
| 2,388,297 A | 11/1945 | Slaughter |
| 2,500,258 A | 3/1950 | Mazzoni |
| 2,776,521 A | 1/1957 | Zimmerman |
| 2,920,354 A | 1/1960 | Zumbrunnen |
| 3,000,049 A | 9/1961 | Terry, Jr. |
| 3,175,028 A | 3/1965 | Waldes et al. |
| 3,197,535 A | 7/1965 | Morin |
| 3,328,503 A | 6/1967 | Ancker |
| 3,381,563 A | 5/1968 | Bishop |
| 3,608,034 A | 9/1971 | Bramley et al. |
| 3,661,689 A | 5/1972 | Spanier |
| 3,714,320 A | 1/1973 | Shaw |
| 3,746,602 A | 7/1973 | Caroli et al. |
| 3,813,281 A | 5/1974 | Burgess et al. |
| 3,947,204 A | 3/1976 | Ayres et al. |
| 3,959,542 A | 5/1976 | Livermore |
| 3,992,765 A | 11/1976 | Silverbush et al. |
| 3,993,725 A | 11/1976 | Brown |
| 4,014,965 A | 3/1977 | Stube |
| 4,014,970 A | 3/1977 | Jahnle |
| 4,055,019 A | 10/1977 | Harvey |
| 4,065,539 A | 12/1977 | Nadel |
| 4,065,950 A | 1/1978 | Green et al. |
| 4,090,322 A | 5/1978 | Hake |
| 4,097,324 A | 6/1978 | Emmel |
| 4,115,489 A | 9/1978 | Macfee |
| 4,176,149 A | 11/1979 | Moertel |
| 4,198,707 A | 4/1980 | Haupt et al. |
| 4,217,326 A | 8/1980 | Goralnik |
| 4,229,496 A | 10/1980 | Striegel |
| 4,296,533 A | 10/1981 | Doerter |
| D263,483 S | 3/1982 | Chen |
| 4,323,531 A | 4/1982 | Bradley et al. |
| 4,329,311 A | 5/1982 | Moertel |
| 4,352,766 A | 10/1982 | Bradley et al. |
| 4,386,043 A | 5/1983 | Takeshima |
| 4,409,275 A | 10/1983 | Samowich |
| 4,442,150 A | 4/1984 | Greiner et al. |
| 4,451,421 A | 5/1984 | Jones et al. |
| 4,493,865 A | 1/1985 | Kuhlmann et al. |
| 4,510,108 A | 4/1985 | Cleereman et al. |
| 4,559,251 A | 12/1985 | Wachi |
| 4,564,539 A | 1/1986 | Tsuji |
| 4,731,041 A | 3/1988 | Ziegler |
| 4,731,212 A | 3/1988 | Hasegawa |
| 4,732,724 A | 3/1988 | Sterner |
| 4,806,405 A | 2/1989 | Liebl |
| 4,830,809 A | 5/1989 | Liebl |
| 4,842,905 A | 6/1989 | Stech |
| 4,851,274 A | 7/1989 | D'Elia |
| 4,888,145 A | 12/1989 | Allner et al. |
| 4,929,505 A | 5/1990 | Washburn et al. |
| 4,930,832 A | 6/1990 | Shelton |
| 4,938,913 A | 7/1990 | Ward et al. |
| 4,948,355 A | 8/1990 | Knoll |
| 4,951,689 A | 8/1990 | Jones |
| 5,100,358 A | 3/1992 | Volger |
| 5,148,591 A | 9/1992 | Pryor |
| 5,157,804 A | 10/1992 | Williams |
| 5,163,552 A | 11/1992 | Thuswaldner |
| 5,183,430 A | 2/1993 | Swann |
| 5,202,166 A | 4/1993 | Crompton et al. |
| D339,265 S | 9/1993 | Claesson |
| 5,272,805 A | 12/1993 | Akeel et al. |
| 5,285,567 A | 2/1994 | Thuswaldner |
| 5,306,532 A | 4/1994 | Tsien et al. |
| 5,316,820 A | 5/1994 | Harpell |
| 5,316,823 A | 5/1994 | Etchu et al. |
| 5,331,232 A | 7/1994 | Moy et al. |
| 5,333,532 A | 8/1994 | Smirlock et al. |
| 5,339,598 A | 8/1994 | Rink et al. |
| 5,345,679 A | 9/1994 | Lennon et al. |
| 5,354,531 A | 10/1994 | Gumbert |
| 5,376,322 A | 12/1994 | Younessian |
| 5,381,339 A | 1/1995 | Yoko et al. |
| 5,388,318 A | 2/1995 | Petta |
| 5,472,365 A | 12/1995 | Engel |
| 5,515,541 A | 5/1996 | Sacks et al. |
| 5,523,141 A | 6/1996 | Fyler |
| 5,601,895 A | 2/1997 | Cunningham |
| 5,651,169 A | 7/1997 | Ohuchi et al. |
| 5,668,555 A | 9/1997 | Starr |
| 5,732,194 A | 3/1998 | Jones |
| 5,792,974 A | 8/1998 | Daqis et al. |
| 5,813,114 A | 9/1998 | Blacket et al. |
| 5,844,814 A | 12/1998 | Chliwnyj et al. |
| 5,853,863 A | 12/1998 | Kim |
| 5,906,873 A | 5/1999 | Kim |
| 5,917,726 A | 6/1999 | Pryor |
| 5,947,311 A | 9/1999 | Gregory |
| 5,963,712 A | 10/1999 | Fujita et al. |
| 5,964,393 A | 10/1999 | Feldpausch et al. |
| 5,983,467 A | 11/1999 | Duffy |
| 5,989,480 A | 11/1999 | Yamazaki |
| 6,037,031 A | 3/2000 | Jones et al. |
| 6,071,455 A | 6/2000 | Hutchison et al. |
| 6,116,980 A | 9/2000 | Bauer |
| 6,159,590 A | 12/2000 | Kim |
| 6,607,684 B1 | 8/2003 | Lee et al. |
| 7,527,845 B2 | 5/2009 | King et al. |
| 7,807,247 B1 | 10/2010 | Bromley et al. |
| 2003/0180540 A1 | 9/2003 | O'Connor et al. |
| 2005/0214499 A1 | 9/2005 | O'Connor et al. |

FOREIGN PATENT DOCUMENTS

| | | |
|---|---|---|
| EP | 0357282 | 3/1990 |
| EP | 0657110 | 8/1994 |
| EP | 0955515 | 11/1999 |
| EP | 1224070 | 8/2007 |
| FR | 482337 | 3/1917 |
| FR | 2193702 | 7/1972 |
| FR | 2397166 | 7/1977 |
| GB | 2261589 | 5/1993 |
| GB | 2287639 | 9/1995 |
| GB | 2302794 | 2/1997 |
| JP | 186899 | 7/2000 |
| WO | WO 92/08094 | 5/1992 |
| WO | WO 93/08094 | 5/1992 |
| WO | 93/21492 | 10/1993 |
| WO | 93/21495 | 10/1993 |
| WO | WO 95/07033 | 3/1995 |
| WO | WO 98/00039 | 1/1998 |
| WO | WO 98/53715 | 12/1998 |
| WO | 01/32404 | 5/2001 |
| WO | 02/43955 | 6/2002 |

OTHER PUBLICATIONS

Raspor et al., "Solid-Phase Forming and Coforming of High-Performance Thermoplastics," 1988.

Titus, Joan B., "Solid-Phase Forming (Cold Forming) of Plastics," Jan. 1972.

U.S. Appl. No. 09/677,047, filed Sep. 29, 2000, O'Connor et al.

U.S. Appl. No. 10/111,778, filed Dec. 11, 2002, O'Connor et al.

Knights, "Injection Molding Close Up—Mold Micro Parts Just One Pellet at a Time", Plastics Technology, Online Article, retrieved from: http://www.ptonline.com/articles/mold-micro-parts-just-one-pellet-at-a-time, Nov. 2001, 2 pages.

Piotter et al., "Micro Moulding of Medical Device Components", Business Briefing: Medical Device Manufacturing & Technology, 2004, 3 pages.

U.S. Appl. No. 13/170,220, filed Jun. 28, 2011, O'Connor et al.

FLEXLOCK WITH HEADED PINTLE AND CONICAL BUTTRESSING

CROSS REFERENCE TO RELATED APPLICATIONS

This application is a continuation of U.S. patent application Ser. No. 12/022,110 entitled "Flexlock With Headed Pintle and Conical Buttressing" filed on Jan. 29, 2008, now U.S. Pat. No. 7,807,247, which claims the benefit under 35 U.S.C. §119(e) to U.S. Provisional Patent Application No. 60/898,223 entitled "Flexlock With Headed Pintle and Conical Buttressing" filed on Jan. 29, 2007. U.S. patent application Ser. No. 12/022,110 is also a continuation-in-part of U.S. application Ser. No. 10/373,423 entitled "Direct Forming of Non-Textile Fabric Elements From Thermoplastic Pellets or the Like" filed on Feb. 24, 2003 now U.S. Pat. No. 7,972,549, which is a divisional of U.S. patent application Ser. No. 09/677,047 entitled "Direct Forming of Non-Textile Fabric Elements From Thermoplastic Pellets or the Like" filed on Sep. 29, 2000, now abandoned, which claims benefit under 35 U.S.C. §119(e) to U.S. Provisional Patent Application No. 60/162,344 entitled "Direct Forming of Non-Textile Fabric Elements From Thermoplastic Pellets or the Like" filed on Oct. 29, 1999. U.S. patent application Ser. No. 12/022,110 is also a continuation-in-part of U.S. patent application Ser. No. 10/491,923 filed May 17, 2004, now U.S. Pat. No. 7,527,845, which is the national stage application of PCT International Patent Application No. PCT/US01/44478 entitled "Connection Element Structure for a Non-Textile Fabric" filed on Nov. 28, 2001, which claims the benefit under 35 U.S.C. §119(e) to U.S. Provisional Patent Application No. 60/286,909 entitled "Connection Element Structure For a Non-Textile Fabric" filed on Apr. 27, 2001 and U.S. Provisional Patent Application No. 60/253,649 Entitled "Connection Structure For Elements in Direct Formed Non-Textile Fabrics That Facilitate Attachment Along Seams" filed on Nov. 28, 2000. All of the foregoing applications are hereby incorporated in their entireties by reference as though fully disclosed herein.

FIELD OF INVENTION

The present invention relates to a combination polymer processing and article manufacturing process, and more particularly relates to a method and system for creating uniquely shaped polymer elements in an interlinked structure of non-textile fabric, preferably from forgeable materials. In addition to materials that can be made to flow and conform to a mold when subjected to high heat and/or forces, forgeable materials also include those that can be made to flow and conform to a mold when subjected to substantial mechanical forces at temperatures lower than the material's or thermoplastic's normal melting temperature. The shapes proposed lend themselves to being formed in pre-determined arrays and interconnected to one another by forming adjacent elements directly onto or against one other. The nature of the interconnection between the elements is such that a 4-axis bending movement is provided for a natural fabric-like feel.

BACKGROUND OF THE INVENTION

The use of plastics has become pervasive in present-day products of all types. The processes by which plastics are formed into or integrated as specific elements with the products have been carefully developed to generally maximize the volume of product output and performance characteristics of the resulting plastic products. Typically, the polymer process is used to form a complete individual product, such as a packaging structure (plastic bottle) or an individual element of a larger article (gear member for a low power drive train, or a filament of thermoplastic for combining into yarn or synthetic textiles).

The traditional and well-known plastic forming processes include, among others, injection molding, blow molding, and extrusion. Each of these forming processes has several related sub-processing techniques, and they all require the plastic starting material to be transformed into a molten state for the process to perform as desired. The molten thermoplastic stream is generated by masticating plastic pellets (and perhaps some regrind from the offal of previous molding processes) to work and heat the resulting mass to molten temperatures. At times, this molten requirement mandates the use of relatively complex equipment, and the processing parameters must be precisely controlled for successful processing. It was important to consider all manufacturing methods while creating the novel and unique non-textile fabric of the present embodiment. Non-textile fabric here means a generally flexible web made of individual interconnected elements, the web having many of the characteristics of textile fabric, but not depending on fibers or fiber related processes for these characteristics. Chain mail is one example of a non-textile fabric. It was initially speculated by the inventors of the present embodiment, in European Patent Application no. 00 976 729.4 entitled, "Direct Forming of Non-Textile Fabric Elements from Thermoplastic Pellets or the Like", that because the use of these traditional plastic forming processes can sometimes result in certain variations within the material by the time the material has reached its final form (an element that acts as a building block of the non-textile fabric), it may be of some use to, in conjunction with utilizing a novel manufacturing method herein referred to as "direct forming", utilize solid phase (cold) forming techniques. However, through experimentation, prototypical analysis, and finite element analysis methods, it has been determined that indeed, not only are solid phase forming techniques nonessential towards the production of the elements, but that the elements themselves and therefore the non-textile fabric in its entirety may be made by a variety of manufacturing methods. In fact, it has been shown that one method that yields very favorable results is injection molding.

The resultant material from the Direct Forming process, known as "Flexlock"™, represents an application of modern materials science and novel production techniques to the concept of chain mail. The physical construction of Flexlock comprises intimately interlinked hard, durable elements resulting in up to four bending axes and mimics the flexibility of ballistic fabric or leather. Unlike these conventional mediums, however, Flexlock panels can provide a wide range of physical strengths, depending on the base materials from which the interlocking elements are formed.

An advantage of Flexlock over fiber-based armoring or "ballistic" materials that lose strength upon becoming wet, is that Flexlock is inherently more moisture tolerant than conventional fiber based ballistic materials due to the vastly lower net surface area presented by the directly formed elements, and Flexlock will not wick moisture into the laminate, and can incorporate hydrophobic materials in the composition of its elements.

Also, the reception of projectiles in current fiber-based armor involves reliance on frictional fiber interaction to entangle and slow the projectile. The lubricating effects of moisture degrade this frictional fiber interaction. A benefit of incorporating Flexlock into a body armor system is that Flexlock elements do not rely on such frictional interaction, but are instead integrally and intimately coupled to one another to radially transmit high strain rate impact forces from a point of impact outwardly through the intimately interlocking, adjacent elements.

Another advantage of Flexlock over fiber-based systems is that unlike fiber, Flexlock elements are highly resistant to abrasion. Flexlock would therefore be of great value in areas contaminated with airborne or waterborne sand or dust. A further advantage of Flexlock is that it can be strategically designed to provide increased levels of protection in vulnerable areas of the protected person or item while providing a satisfactory level of protection in the less crucial regions. For example, a continuous panel of Flexlock can include areas of increased stiffness simply by increasing the stiffness, in particular the inherent frictional stiffness provided by the intimately formed connections of the individual elements in that area. For example, a higher degree of protection (stiffness, toughness, or other properties), may be desired over areas like organs, the head, neck, and shoulders, or sensitive portions of equipment, while still providing an appropriate level of protection over the remainder of the person or item. This feature lends economic benefits to the use and production of Flexlock. This can be achieved by resin fusing or by simply layering sheets of Flexlock material over crucial sites where high degrees of flexibility may not be of utmost importance.

The resulting Flexlock product has the desired qualities of flexibility, durability, mobility, strength, and sustainability that were predicted in the previous, aforementioned applications.

Of course it is still possible to manufacture the present embodiment by utilizing the theories and techniques of solid phase forming. Shell Development Company developed solid phase forming, or superplastic forming, and "Scrapless Forming of Plastic Articles" was created by Dow Chemical Company. This solid phase forming process is used to create monolithic plastic articles having high heat distortion temperatures, expanded or porous layers with integrally formed skin, using ultra high molecular weight polymers, and blended or layered structures of two or more materials. A related process is also used in the forming of metals, particularly aluminum or titanium, to form forged aluminum shapes from precisely formed slugs of metal.

It has been stated, within the abovementioned PCT applications, that the non-textile fabric (NTF) is made by employing the novel and unique process of "direct forming". Direct forming is a process wherein at least a portion of a "second" element of the non-textile fabric is created by forming the at least portion of the second element against an existing "first" element or portion thereof. Simply, a portion of the first element forms a mold surface of the next, second element. In one such disclosed embodiment, the first and second elements comprised male and female elements. It should be understood by one of ordinary skill in the art that the NTF elements could take a number of varying geometries, be they in their entirety or in part "male" (protrusive) in nature, "female" (receptive), both male and female, or androgynous or neutral. The original disclosure's predicted success of creating a NTF by using the direct forming method is evident in the current, several promising NTF prototypes created by the inventors of the direct forming method and structure.

A benefit of the direct forming of some of the elements using injection molding methods in the manufacturing is that subsequent handling of the material and/or elements themselves is minimal. Again, it should be understood that as long as one used the direct forming method, (that is, forming at least a portion of one element by forming it against at least a portion of another element), the particular molding/shaping/forming/creating method used has been found to be of secondary importance. Thus only one manufacturing method is used in the creation of the NTF—both the elements and the NTF (assemblage of elements) is created by the same method and therefore it could be said in the same step. In one embodiment, the starting material is a polymer pellet. Of course, it should be understood by one of ordinary skill in the art that the starting material could be of any material composition including polymer, composite, ceramic, metal, liquid metal or metallic glass, organic, or any other material. Furthermore the state and/or shape, volume, properties and so on of the initial stock may vary—the stock could comprise liquid, solid, gas, powder, and so on.

BRIEF SUMMARY

Detailed herein is a formed element from which a non-textile fabric can be made from an assemblage of many other formed elements. This formed element having three sides and at least one connection structure at each side that permits hinging connection with at least one hinge knuckle of another element of the non-textile fabric. This connection structure defines a hinging axis about which the hinge knuckle of the other element may rotate relative to the formed element. This overall triangular shape is defined in part by intersecting lines drawn through the hinging axes of each connection structure. There are buttressing portions sized and positioned to abut similar buttressing portions of adjacent other elements and positioned near the intersections of such lines, each buttressing portion defined in part by a pair of surfaces, each of these surfaces being a surface of rotation defined by an axis of rotation coaxial with a hinging axis. In some embodiments, each of these buttressing portions has a pair of conical shapes defined by an axis of rotation and a conical angle, while in another embodiment, the surface of rotation has the shape of part of a cylinder. For best effect, the conical angle of a conical shape at the vertex is equal to approximately one half of the intersecting angle defined by the intersecting sides as the vertices. Connection elements can include headed pintles, conical protrusions or continuous axles, or mating concavities that exactly fit these pintles, conical protrusions or axles. The connection structure may have a plurality of hinge knuckles spaced along a side of the overall triangular shape for greater strength for example. These knuckles may not be all the same size, and can benefit from varying in overall diameter from largest towards the middle of the side of the element, to smaller towards the buttressing portions.

Also disclosed is a combination of a formed element and another element from which a non-textile fabric can be made from an assemblage of many other formed elements. The formed element as detailed has an overall triangular shape in plan with three sides and at least one connection structure at each side that permits hinging connection with the other element, and each connection structure defining a hinging axis about which the other element may rotate relative to the formed element. The overall triangular shape is defined at least in part by intersecting lines drawn through these hinging axes. There are buttressing portions near the intersections of these lines. The connection structure has a plurality of hinge knuckles spaced along at least one side of the overall triangular shape, where at least one of the plurality of hinge knuckles are sized to position the hinging connection with the other element about half way between the intersections along that side. The other element has a central bar portion and a pair of oppositely projecting headed pintles molded at each end thereof, and this one pair of oppositely projecting headed pintles is axially positioned between the formed element's hinge knuckles.

The central bar portion of the other element is dimensioned to space the pair of oppositely projecting headed pintles at one end of the bar portion from the pair of oppositely projecting headed pintles at the other end of the bar portion so as to permit a second formed element hingedly attached to other end of the bar portion by the oppositely projecting headed pintles, to fold over onto the formed element.

Regarding the buttressing portions of the formed elements, the conical shape provides a mechanical contact between other adjacent elements in a non-textile fabric even when the other adjacent elements have rotated out of a common plane, but permits such other adjacent elements to move and rotate about the various hinging axes among elements in the non-textile fabric.

Other aspects, features, and details of the present embodiment can be more completely understood by reference to the following detailed description of a preferred embodiment, taken in conjunction with the drawings and from the appended claims.

DETAILED DESCRIPTION

The present embodiment utilizes the principles of the novel and unique method of manufacture referred to as "Direct Forming" to create a unique form of non-textile fabric referred to as Flexlock™.

One of the intended uses of the non-textile fabric is as an outer surface for luggage or other like articles where a durable, flexible outer surface is desired to withstand various types of physical abuse. Other various uses for the non-textile fabric are possible and contemplated. For example, there exist military applications wherein a non-textile fabric may aid in energy absorption and dispersion in combat protective gear such as clothing or body armor and structures such as tents, vehicles, buildings, and so on. Flexlock can be used to enhance existing body armor by adding flexible, comfortable, compact, effective Flexlock components at known weak points and/or gaps in existing body armor coverage. The flexibility of the Flexlock material allows for easy assembly and installation of complex shapes compared to conventional, rigid reinforcement armor plate. Flexlock can be stacked in multiple layers depending on its intended use to meet specific force resistance requirements. It can be postulated that Flexlock, due to its force distribution properties and stacking abilities, when used separately or in conjunction with current armor systems of persons and/or structures that employ fabric technology, can reduce the weight of these current protective devices. A further benefit of the principles of direct forming and Flexlock material is that because Flexlock can comprise polymers, the strength, density, durability, and other properties of the Flexlock material can be varied depending upon its desired use, simply by altering the composition of the starting material or feedstock.

Figure 1:
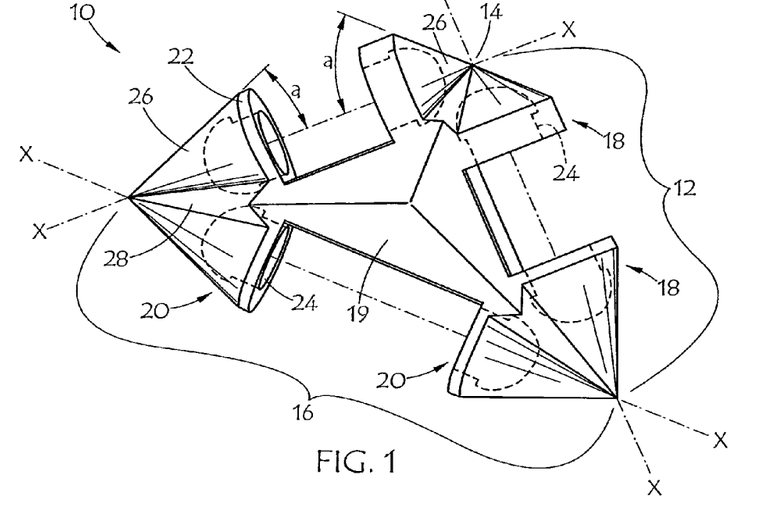
FIG. 1 is a top perspective view of an embodiment of a female element.

Shown in FIG. 1 is a female element 10 that forms a right isosceles triangle (a triangle having two sides 12 of equal length with a right angle formed therebetween). This element is shown for clarity in isolation from the direct formed male elements whose adjacent sides normally comprise the surfaces directly against which portions of the connection structures 18 and 20, specifically at least the recesses 24, have been molded or formed. These connecting structures form hinging connections between other such elements in a non-textile fabric assemblage. These hinging connections define a hinging axis x along each side of the shape of the element, which is generally triangular in plan. These axes are shown as intersecting lines x-x that form intersections near the vertices of this triangular shape. The tip 14 at the intersection of the equal-length sides terminates in a buttressing portion for bearing against another identically shaped female element whose intersection of equal-length sides is also similarly terminated. The tip 14 of the female element 10 comprises a pair of conical shapes as will be detailed below.

Each of the two equal-length sides 12 as well as the longer side 16 of the three sides of the female element 10 defines at least one connection structure to receive a corresponding connection structure formed on the edge of the mating male element. The female element 10 comprises on each of its two equal length (shorter) sides 12 a short connection structure 18 and on its longer side 16 a long connection structure 20. Each connection structure 18 and 20 comprises boss 22 that terminates conical shaped surface 26, and recess 24. The bosses of the connection structure preferably extend above and below the plane of the main body 19, and thus help deflect from the main body the wear and tear during use. Of course, the shape, orientation of the boss to the element, and the volume of the bosses can vary greatly. For example, the bosses 22 and surface 26 could lie flush with the body of the female element 10 to create an entirely flat NTF (see FIGS. 13 through 16 for example where equivalent surfaces comprise portions of a right circular cylinder), or the bosses could protrude having extreme or angular geometries to create an artistic effect.

Figure 2:
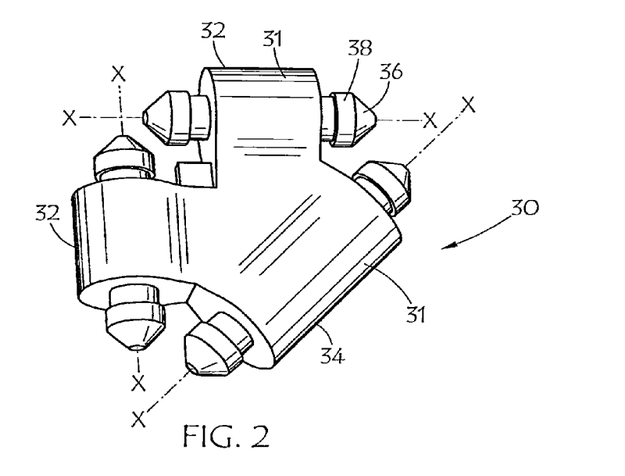
FIG. 2 is a top perspective view of an embodiment of a male element.
Figure 3:
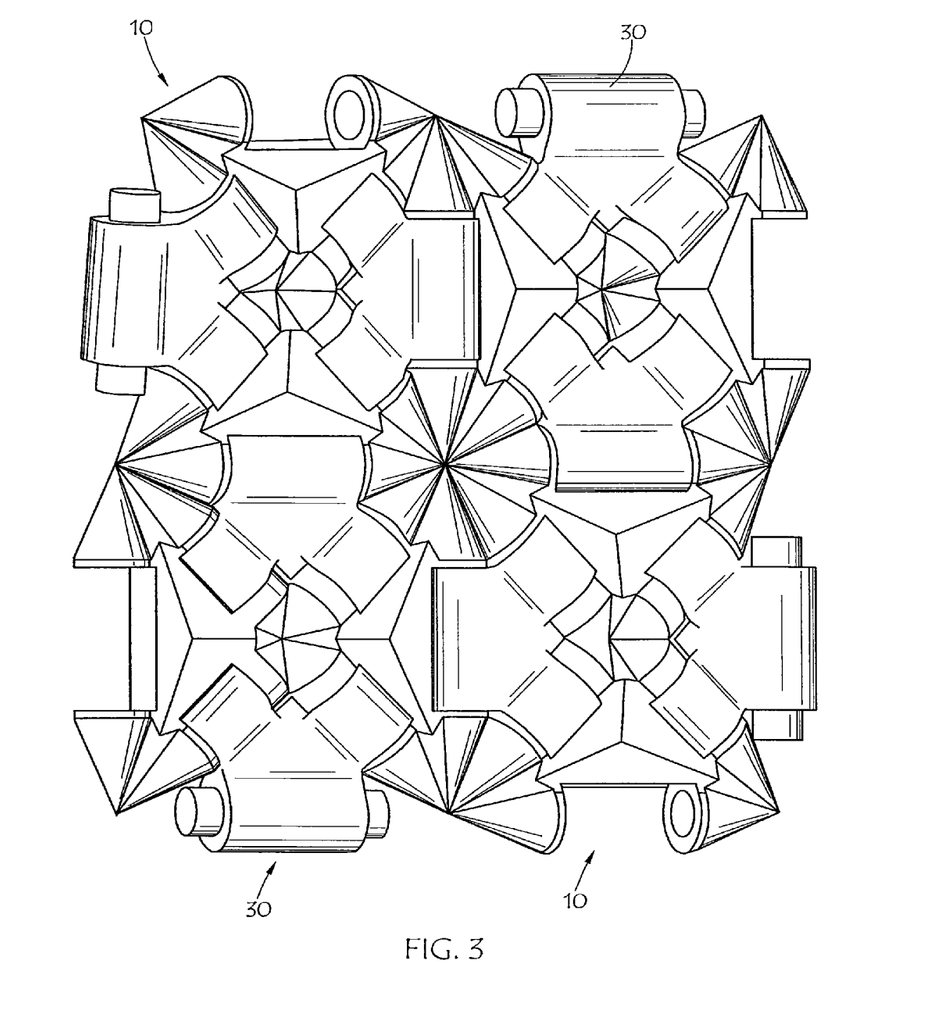
FIG. 3 is a plan view of a non-textile fabric comprised of the elements shown in FIGS. 1 and 2.
Figure 4:
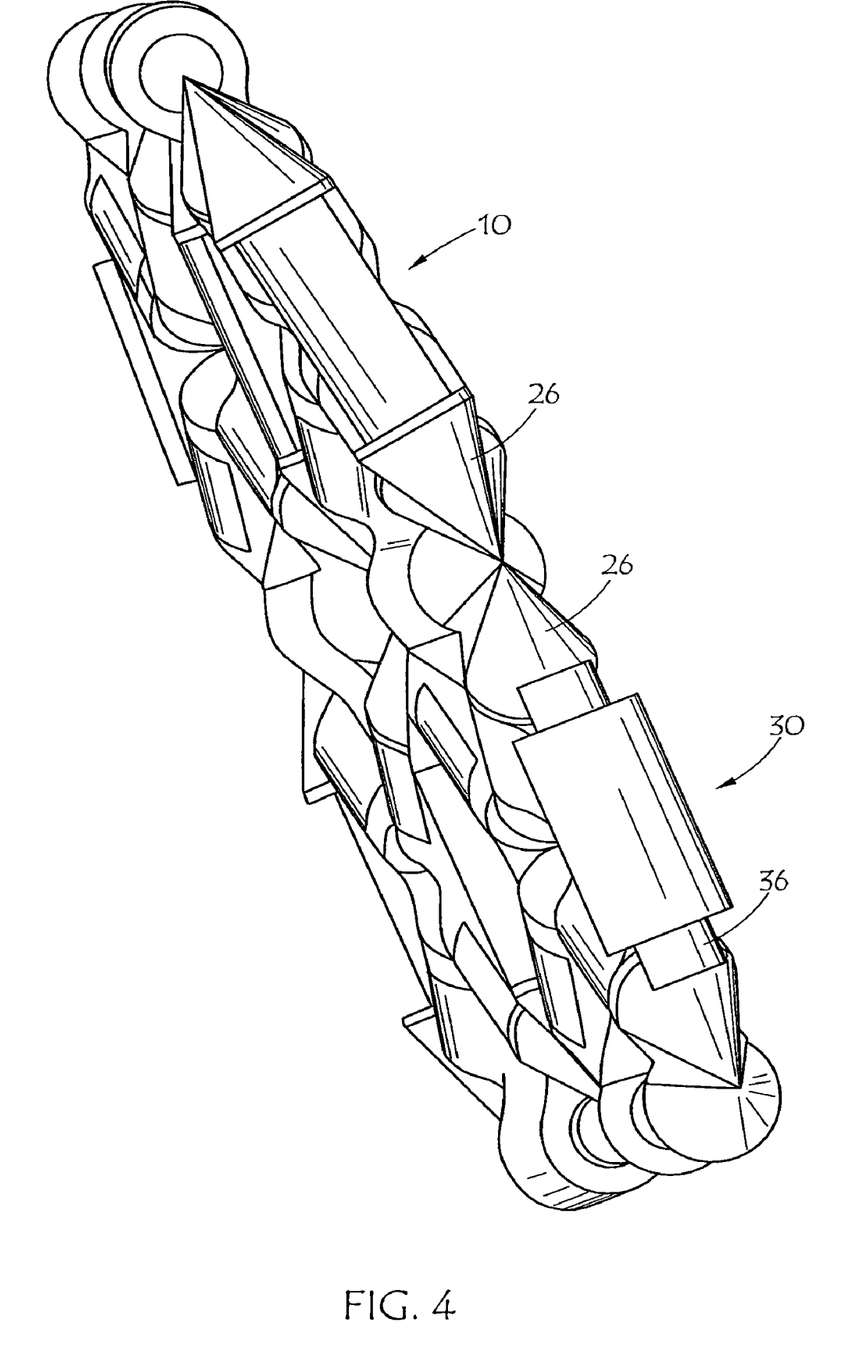
FIG. 4 is a side perspective view of the non-textile fabric of FIG. 3.
Figure 5:
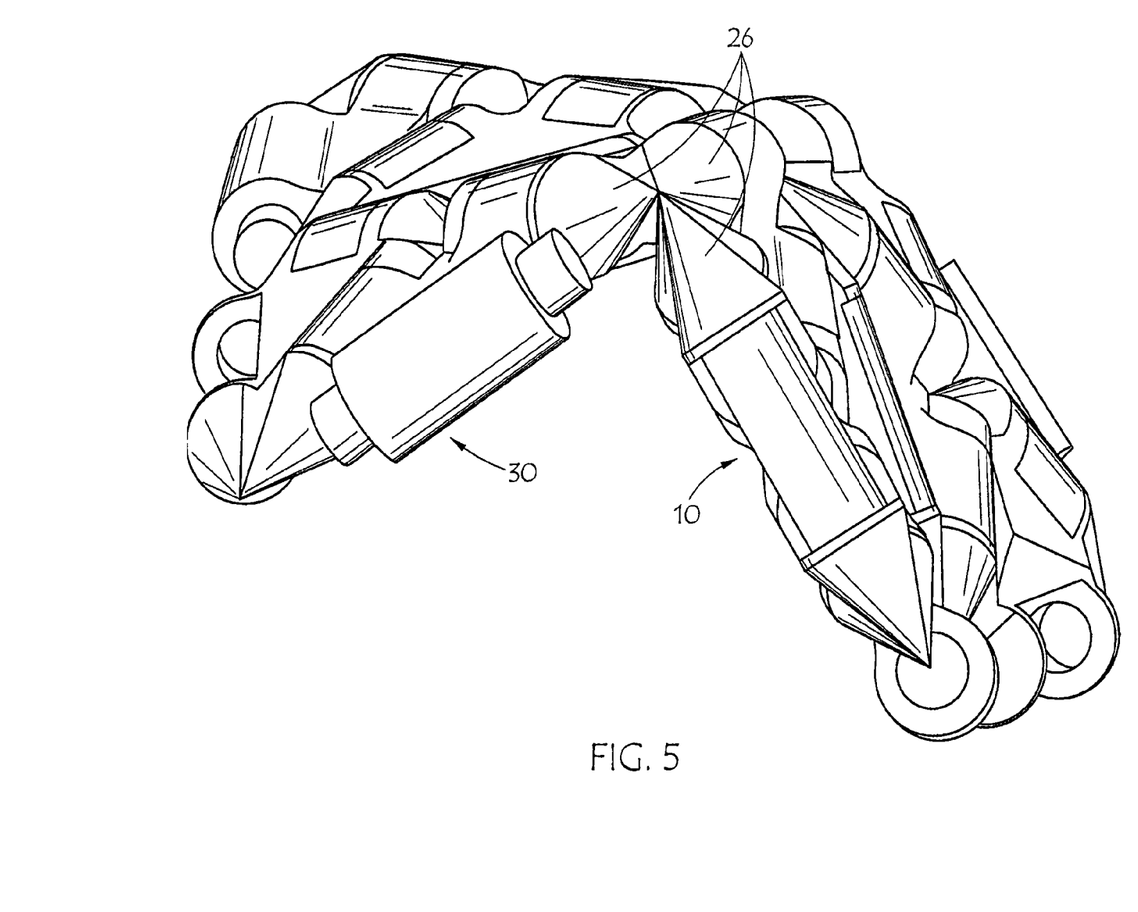
FIG. 5 shows how the non-textile fabric of FIG. 3 would look when the assembled elements are hingedly rotated out of a common plane.

Recess 24 is directly formed over (i.e., molded in direct contact with) the male connection structure (see FIG. 2). Recesses 24, generally cylindrical, are formed in each boss 22, with the recesses opening inwardly along the sides of the boss to a gap formed between the knuckles. The female bosses 22 join external surfaces that are generally conical, with a structural fillet portion 28 connecting the pairs of conical shapes together to form each buttressing portion. In particular, each conical shape of these pairs are defined by a conical angle "a" which describes the conical surface of rotation about the corresponding hinging connection axis. The conical geometry facilitates biaxial or twisting motion of the NTF. An advantage of providing the buttressing portions is that it helps maintain an intimate engagement of the between elements in the NTF and by doing so holds the assembled NTF elements together intimately even when elements with adjacent conical shaped surfaces 26 are rotated out of a common plane. This buttressing is similar to the stacked teeth of a closed zipper help prevent separation or tearing of the zipper teeth. The connecting portion of the male element cannot be easily pried out of the female connection structures 18, 20 especially when the conical shaped surface 26 are contacting a corresponding surface of an adjacent element. FIGS. 3, 4 and 5 illustrate the buttressing phenomenon and show how the NTF can be flexed in multiple directions while still providing durability. As will be detailed, the embodiment of FIG. 12 further leverages this buttressing phenomenon by substituting simple conical male protrusions for the general cylindrical shaped pintles shown in FIGS. 1 through 4.

More particularly, the conical shaped surfaces of the buttressing portions have a particular configuration to accomplish this buttressing function even when the elements of the mutually buttressing portions have hinged into complex, out of plane positions such as that shown in FIG. 5. Preferably, each cone shape is that of a right circular cone that terminates near the annular boss 22. The cone shape has a maximum angle "a" between a generatrix of the conical surface and its axis that is equal to about to one half the included angle of the intersecting axes at that vertex. For an element having an overall right isosceles triangle then, the maximum angle "a" at the vertex between the two shorter sides is forty-five degrees, while the maximum angle "a" at the two remaining vertices is 22.5 degrees.

FIG. 2 shows a male element 30 as created by the Direct Forming process. The male element 30 is also a generally triangular shape in plan with connection structures 32 and 34 formed along each of its sides. This second element preferably also generally has the overall shape of a right isosceles triangle defined by corresponding hinging axes "x" that intersect at the vertices of this overall triangular shape. The connection structure along each edge is basically a cylindrical knuckle 31 with a central pintle 36 formed on each end, and each knuckle connected to the central relatively flat body of the male element 30.

On the equal length edges of the male element 30, the short connection structure 32 is preferably offset toward the non-intersecting ends. These connection structures are at 90 degrees to one another, and are each at about 45 degrees to the connection structure 34 on the longer side of the male element 30.

The long connection structure 34 is also attached to the main body of male element 30 along the length of its knuckle 31. The connection structure 34 comprises pintle 36 that extends beyond either end of the knuckle. The pintle 36 must have the appropriate length and outer shape to form and thus be precisely received in the corresponding recess 24 on the female element 10 in a rotational or hinging manner. As the recess is formed directly against the pintle shape in the preferred manufacturing process, this precision is easily accomplished.

As is illustrated in FIG. 2 the pintle 36 is headed. That is, the pintle comprises head 38, which may be a mass of material having a shape of a surface of rotation with an axis of rotation coaxial with the hinging axis "x", to create a more secure engagement between the male element 30 and female element connection structures 18, 20. Head 38 may comprise any material, and the material of the head 38 may differ from that of different portions of the male 30 or female elements 10, although for the purposes of example throughout this disclosure, the same material is used to make the entire element.

It may be contemplated that portions of the non-textile fabric or of the elements themselves can incorporate, using well-known techniques, a living hinge to provide an additional measure of flexibility. The living hinge may form a thin web, for example, that may be an integral portion of an element connecting the body portion of the element to the connection portion of the element, as an example. The living hinge could flex when relative rotation of the connecting portions of the male and female elements is stopped by mechanical interference between the connection structures. The living hinge would then flex or bend along the blocked connection structures to provide stress relief and an extra measure of flexibility along the bending axes. In an instance wherein the elements are formed by a direct forming process as described herein and the second element is smaller than the first element, the thicker portion of the first element allows the same volume feedstock to be used for the formation of both the first and second elements. In other words, since the second element is smaller in plan than the first element, and the same volume of feedstock is used for each element, the thick central region allows for the extra material to be used up.

Other benefits of a living hinge include ease of processing increased tear strength of the non-textile fabric. The living hinge could simply act as a means for increasing processing and could in fact be eliminated post-processing (by flaming it off, for example). If rigidity of the non-textile fabric is required, it can be obtained not only by providing a feedstock having properties of toughness or other desired properties, but also by providing a living hinge. Living hinge material is only strong when the material flow direction during formation is perpendicular to the axis of bending.

Figures 6, 7:
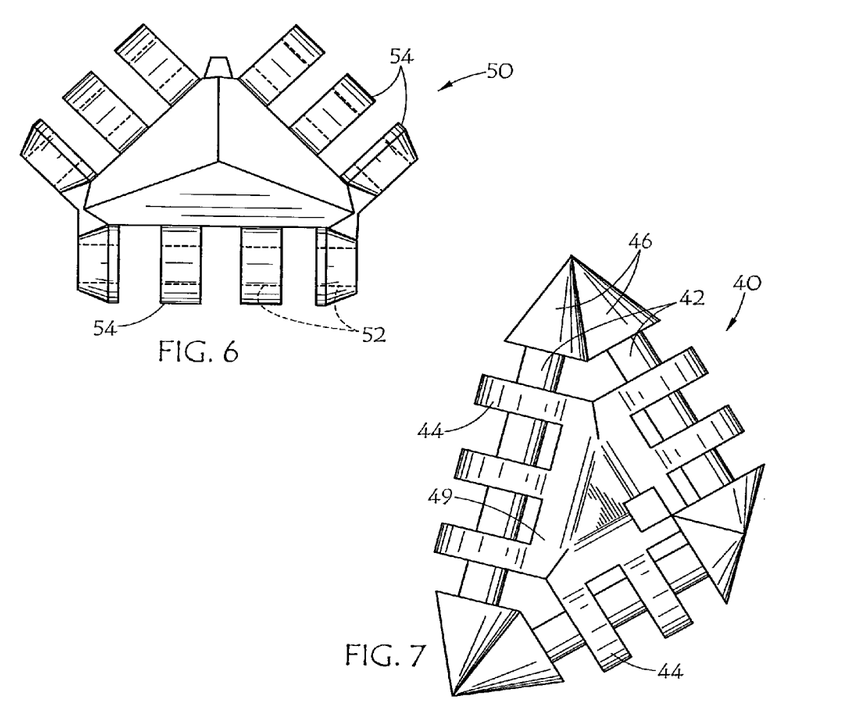
FIGS. 6, 7 and 8 show a second embodiment of a female, male and direct molded pair of elements.

FIGS. 6 through 11 show a slightly modified element configuration and assembled non-textile fabric especially configured for assembly using at least some aspects of the direct forming process. Here FIG. 7 shows the first formed element 40 has at least one hinge pintle 42, preferably a continuous hinge pin or axle along each side, the ends of which terminate at a conical buttressing element 46. The conical shaped portions of the buttressing elements of this embodiment are substantially identical with those of FIGS. 1, 3, 4, and 5 and may be connected with structural fillets similar to those shown in FIG. 1, although the continuous axle 42 helps hold these conical portions in position. Depending on the length of the side on which this connection structure runs, there as two or more hinge knuckles 44 spaced along and integrally molded with each axle. These knuckles are attached to the body portion 49 as shown.

Figure 8:
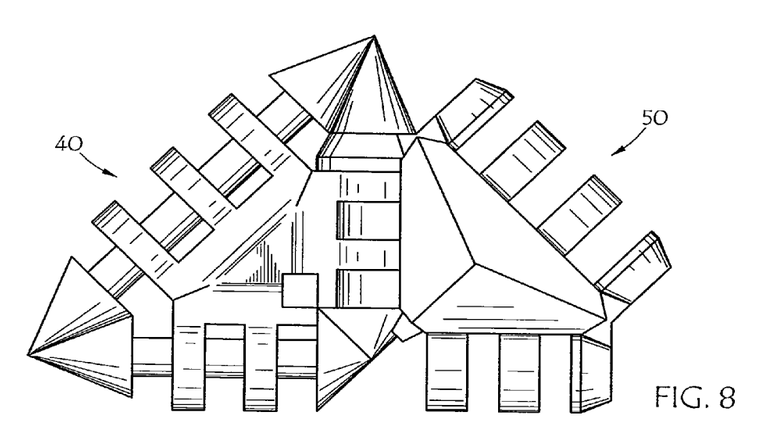
Figure 9:
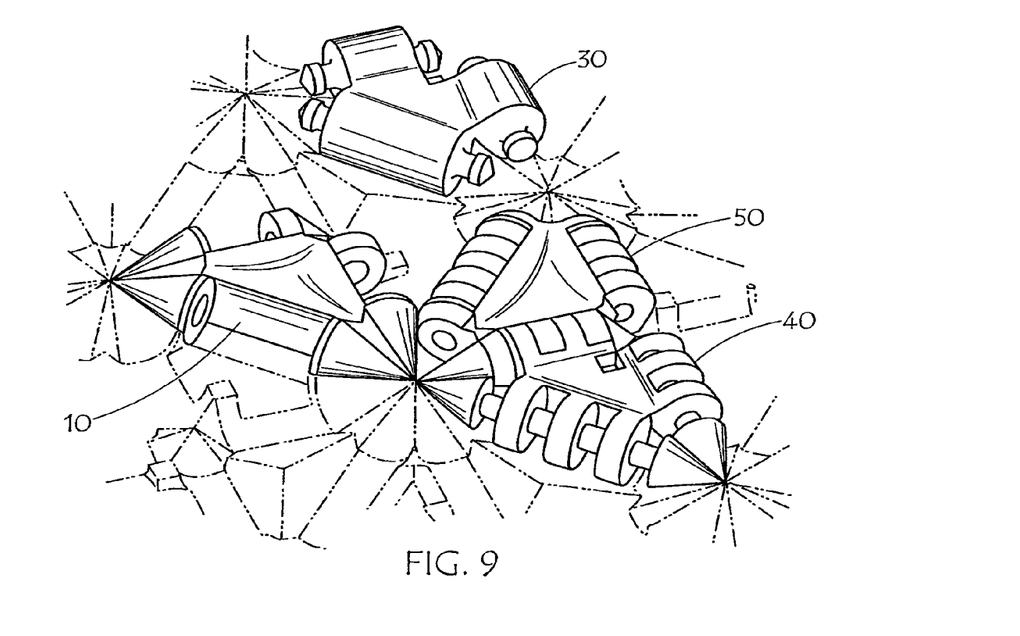
FIG. 9 shows the embodiment of FIGS. 6, 7, and 8 compared to the first embodiment with the elements placed on a direct forming composite mold surface.

The corresponding mating element 50, as shown in FIG. 6, has a connecting structure in the form of a generally cylindrical hinge knuckles 54, in particular a series of knuckles similar to those shown in FIG. 7, but each has a through-hole 52 to receive the continuous hinge pin or axle 42. Preferably at least this connecting structure is formed directly against the corresponding surfaces of the first formed element. More particularly, the hinge pin and at least the adjacent annular surfaces at each end of the hinge pin form corresponding portions of the mold in which the mating element is molded. FIG. 8 illustrates how these two elements, once directly formed against one another in an array, are intimately and firmly attached together for hinging motion. It should be understood of course that all three sides of the mating element 50 are molded against and to male elements positioned along those edges, and FIG. 8 shows only one completed hinged connection for clarity. FIG. 9 shows the mated pair of elements of FIG. 8 positioned in a mold cavity (shown in broken lines) of one of the two matching clamshell type molding plates that could be used in the preferred direct molding process. A male element like that shown in FIG. 2 and a female element like that shown in FIG. 1 are positioned in neighboring mold cavities. It is possible that these two preferred embodiments could use at least some of the same direct molding equipment since the elements have the same overall size, generally right isosceles triangular shape in plan, and similar shaped buttressing portions.

Figure 10:
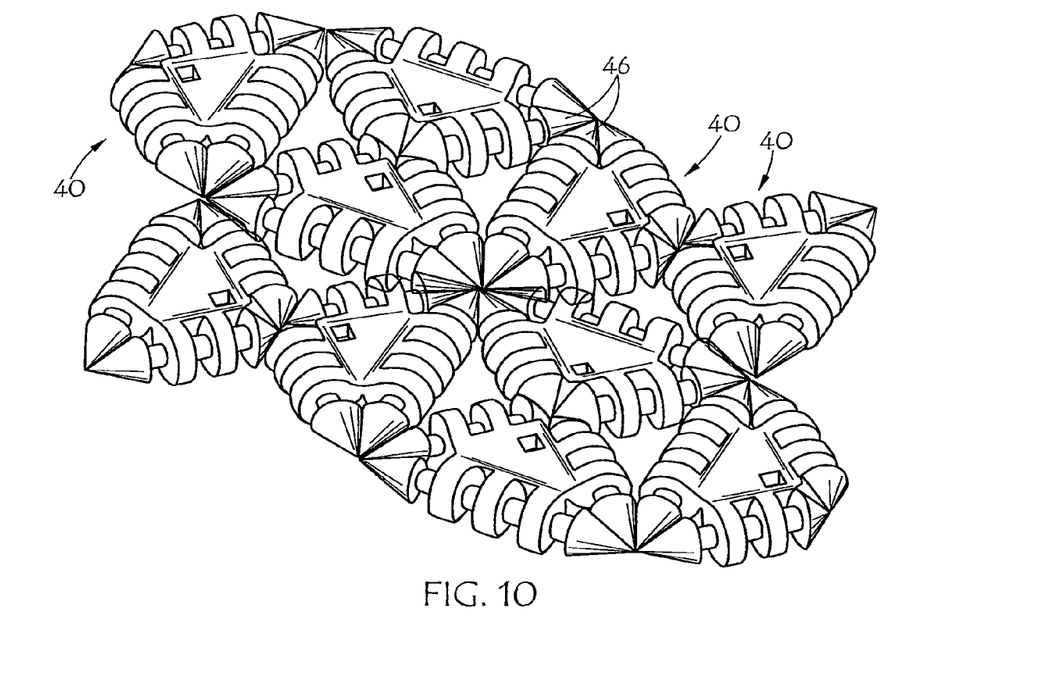
FIG. 10 is a perspective view of an array of male element of FIG. 7 on the direct forming composite mold surface.
Figure 11:
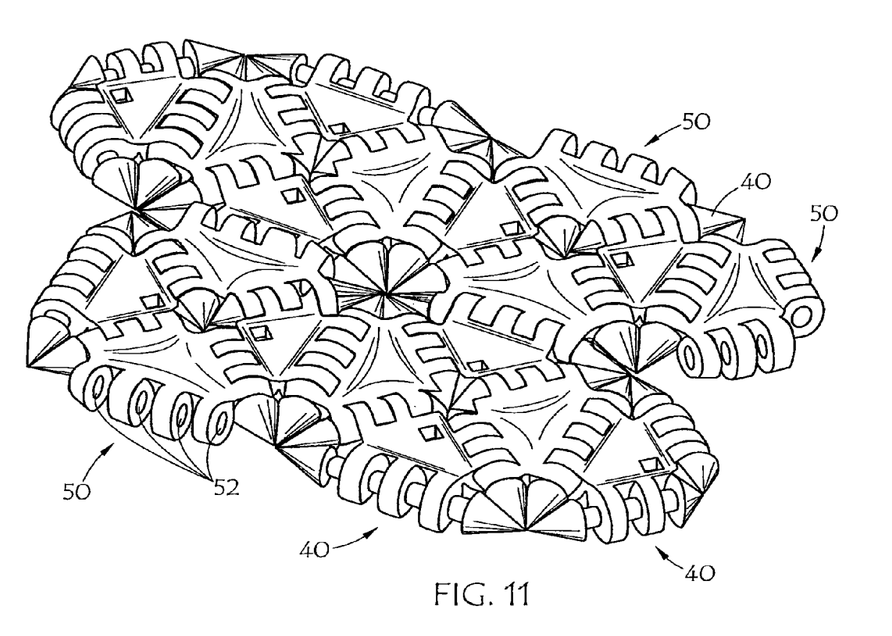
FIG. 11 is similar to FIG. 10, but after an array of female elements of FIG. 6 has been directly formed to create a portion on non-textile fabric.

FIGS. 10 and 11 show some steps of the assembly of the elements of FIGS. 6 and 7. These figures show the elements arrayed as they would be on one of the molding plates depicted in FIG. 9. The mold plates, as taught by the above mentioned parent patent applications, come together to form, in combination with arrayed male elements, the molding surfaces for forming the mating female elements in an overlapping array.

FIG. 10 more accurately shows an array of the elements shown in FIG. 7. The female elements of FIG. 6 have not been made as yet. FIG. 11 shows the female elements arrayed amongst the male elements, having been directly formed as detailed above. The joints made between these arrayed elements are quite strong, and the buttressing conical shapes at the vertices help with this strength but permit hinging movement in multiple planes as detailed above.

Figure 12:
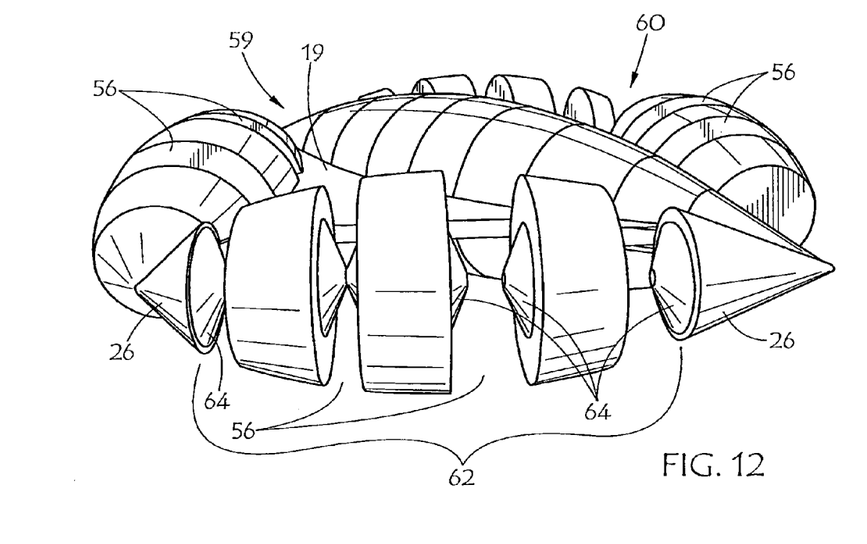
FIG. 12 shows a perspective view of a third embodiment showing a third geometry.

FIG. 12 shows a further embodiment of the formed male and female elements. The first formed or male element 59 is shown on edge with its connection structure 62 along a short side in the foreground, and with a female element 60 hingedly attached to the attachment portion along the long side of this differently shaped but still essentially triangular in plan male element. The knuckles and the interleaved slots 56 of both elements decrease in diameter as they approached the buttressing structures. Essentially, these elements represent the geometries of the previous embodiments, but without the continuous pin. The facing surfaces of the male hinge knuckles have shallow conical protruding surfaces 64 that act as pintles. Although shown as having outer surfaces of a right circular cone or slightly tapering cylinder, the knuckles may have toroidal outer surfaces so that the spaces or slots 56 between knuckles at the bases of the male elements would be gently filleted.

These graduated knuckles are intended to provide more robust connections than uniformly sized knuckles would otherwise permit. These larger knuckles take advantage of the greater distance available towards the center of the triangular body portion 19, since there is more space there before these larger diameters get too near the knuckles along another edge of the triangular element. Furthermore, by reducing the knuckle diameter rapidly as the corners of the triangular element are approached, more knuckles may be molded into the triangular sides.

Preferably, the shallow conical pintles on the larger knuckles would protrude more deeply and have a greater angle than the corresponding pintles between the smaller diameter knuckles. This may shelter the knuckles at the corners, and thus the buttressing cones, from failing catastrophically early since more of the stress will be taken by the larger knuckles. For non-textile fabrics using these connection structures, as the non-textile fabric is pulled, mating conical connections (positive conicals on the male knuckles, negative conicals on the female knuckles), tensile forces are taken by compressive forces at right angles to the abutting surfaces, which elastically yield somewhat in response. Some shear is also applied to the pintles. Pintles that exhibit "necking" or shear yielding aid in the overall tear strength of the non-textile fabric. Necking results in loosening of the connection point between the female and male elements. This loosening tends to give the non-textile fabric a better "hand", much like when conventional leather is "worked" or conventional textiles are "swissed", which refers to fabric or other materials being pounded or run through rollers in order to soften it. Necking, at least before catastrophic failure, also results in molecular orientation, whereby slightly thinned pintles experience an increase in strength. Such loosening, in combination with conical knuckle buttressing and buttressing between the elements via cones 26, can result in a very robust Flexlock assembly. This is similar to the way conventional textiles can generally avoid stress concentrations by letting threads or yarns shift into alignment with those threads or yarns already directly in line with tensile forces. Thus, many threads or yarns begin to share the force amongst each other. Here too, more elements in the non-textile fabric can resist tensile and tearing forces before individual elements or their connection structures begin to fail.

Figure 13:
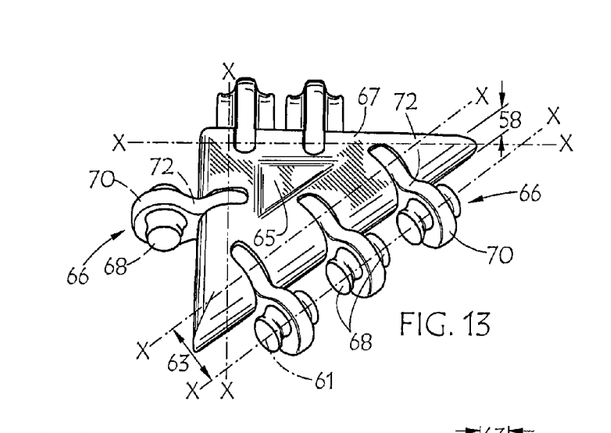
FIG. 13 shows a perspective view of a fourth embodiment which has triangular female elements directly formed over relatively small, individual link-shaped male elements.
Figure 14:
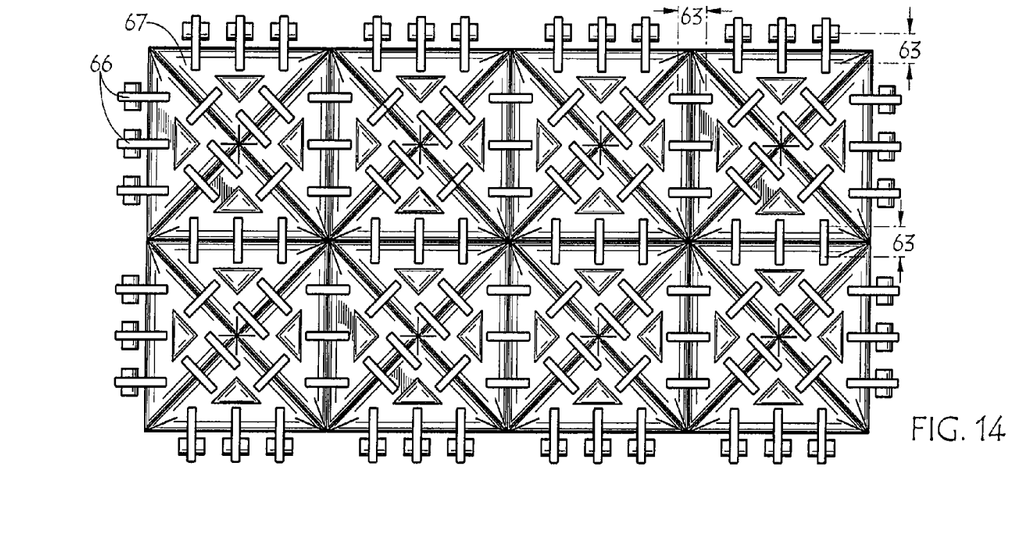
FIGS. 14 and 15 are respectively a plan view and perspective views of an array of the elements of FIG. 13 forming a non-textile fabric.
Figure 15:
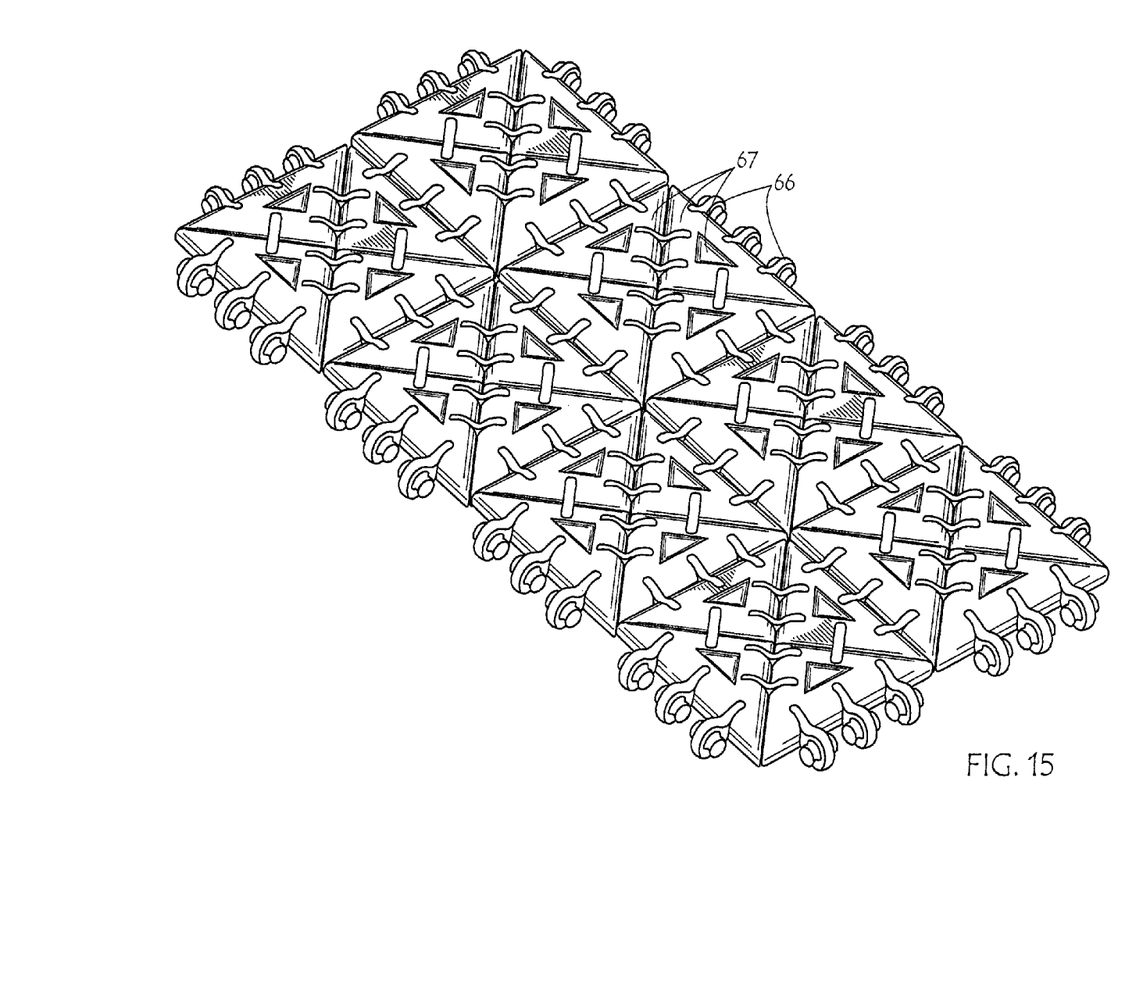

FIGS. 13 through 16 illustrate a further configuration. Here the male elements 66 consist of simple, relatively small chain link-like elements with a pair of oppositely projecting headed protrusions 68 or pintles projecting axially outward from each side of the essentially cylindrical shaped knuckle 70 molded at each end of a central bar portion 72. The protrusions are generally cylindrical, with a narrow waist portion between the distal end of the protrusion and where it integrally connects to the knuckle. As illustrated in FIGS. 13, 14 and 15, only the projecting pintles on the outer ends of the male elements show. The projecting pintles on the other ends are of course embedded in the female element 67 and are arrayed along the hinging axes along each side thereof. These axes are shown as intersecting lines x-x that form intersections or vertices of a triangular shape. The relatively larger right isosceles triangular female element has the cylindrical shaped buttressing terminations at each of its three corners. The female body portion, in contrast to the previous embodiments, is generally flat and of uniform thickness 58 in this case thick enough for the edges to define the cylindrical surfaces adequate for some buttressing even against out-of-plane adjacent elements. Comparing this with the construction of the body portion and conical shaped portions of the buttressing structure of FIG. 1, etc., one can see that these buttressing portions are near but do not terminate at the intersections of these hinging axes lines as do the buttressing portions of the other embodiments, and the body portion here continues between the cylindrical shapes and eliminates the need for a fillet. Also, a portion of a cylinder, rather than a conical surface, is defined by a surface of rotation whose axis extends along hinging axis lines x-x. The diameter of this cylinder portion is equal to thickness dimension 58, and in turn is approximately the same as the diameter of the hinge knuckle 70. The center of the element body has a small "dimple" 65 at or near its geometric center to facilitate the precise centering and penetration of an industrial sewing needle for assembling of the resulting non-textile fabric shapes.

Figure 16:
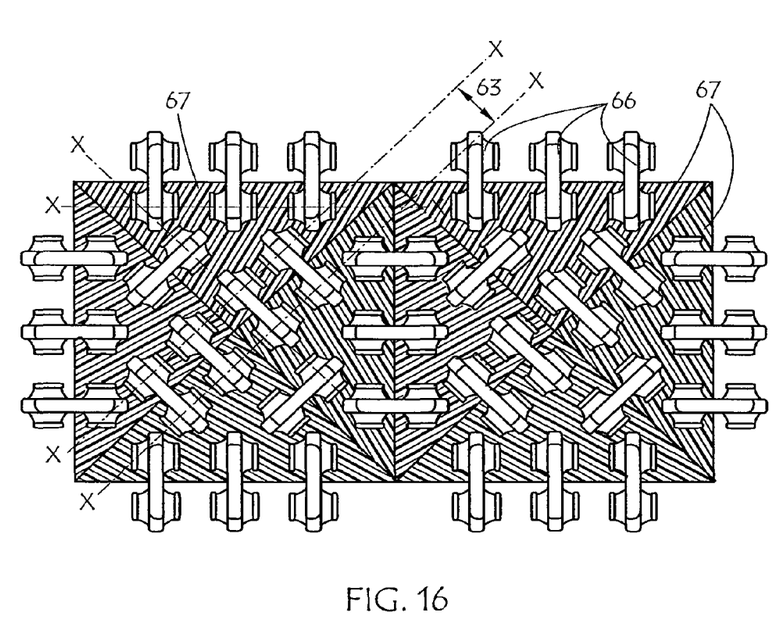
FIG. 16 is a cross section through the female elements of FIGS. 13 and 14 along the plane of symmetry of the non-textile fabric showing the male elements.

The direct forming of these female elements results in intimately formed cavities for receiving the male elements. This is illustrated in FIG. 16. The female elements in the non-textile fabric array are shown cut along their plane of symmetry, exposing the resulting male elements 66 in the direct formed cavities along the sides of the triangular shaped female elements 67. The connections formed between the elements are quite robust. Also, note that unlike the symmetrical geometries of the prior embodiments, this configuration has three male connectors along the long side of each female element, and either one or two male connectors along the other two sides. This arrangement permits dimensioning the male elements so that they are embedded quite deeply in the triangular geometry, but distributed around the periphery of the triangle so that these mating cavities do not to contact or even come close to one another.

The link geometry of the males permits this non-textile fabric to fold flat within the dimension of its own thickness. That is, this non-textile fabric can be folded flat without putting undue strain on the hinging connections. The pivot axes designated by lines x-x defined by the axes of rotation of the projecting headed portions within the female elements define dimension 63. Dimension 63 is equal to or greater than the thickness dimension 58 of the female element. The slots 56 are sized to permit the male elements to rotate about these pivot axes by at least 180 degrees. Thus, adjacent female elements 67 and 67 can be folded onto each other or brought into face to face contact, with the line of connecting male elements at right angles to the thus folded females. This is advantageous since stresses resulting from folding are minimized and thus will not compromise the overall strength of the connections.

The individual components or elements could be made using any manufacturing technique, including solid phase forming, thermal spraying of the stock material that is in a powder form, extrusion, any type of molding including injection, mold, rotational, and other types of molding, laser etching techniques (electrical discharge machining), fabrication methods, hand/wet lay-up methods, spray methods, pultrusion, vacuum forming, and any other method of manufacture. In fact, it may be possible to choose different manufacturing techniques for different components or areas of the NTF. In this way, desired physical properties of the element, resulting from the manufacturing processes used in the making of that particular element, can be chosen according to the function of the element. For example, first elements could be made using solid phase forming techniques, and subsequent elements could be made using injection molding techniques. There are advantages to utilizing varying manufacturing techniques within the creation of a continuous piece of non-textile material. For example, cold forming, wherein the molecules of the resultant elements or product become aligned, may be beneficial in areas of the NTF that require an increase in strength and or durability, such as areas of the NTF that will be used to cover/protect a wearer's elbows and knees. Solid phase forming can improve material properties such as elastic modulus, ultimate tensile yield strength, and low and high temperature impact strengths. These characteristics could help increase the non-textile fabric durability in certain areas and thereby enhance its performance. Softer material (relative to material produced by solid phase forming techniques) may be desired in areas of folds or around keyholes or other points requiring external sewing or fasteners. The elements comprising these areas of the NTF may be made then by injection molding methods, for example. The direct forming process is repeated with the particular element being formed in the appropriate order to form interconnected at least first and second elements with the final result being a non-textile fabric.

Additionally, the direct forming process results in extremely rapid production cycle times. Since the direct-formed elements are very small in size, mold cooling cycles can be extremely short. Also, direct forming of the elements in interconnected relationships simplifies the final assembly of the non-textile fabric. The "direct forming" method provides in-place manufacturing. The elements are formed only in locations where elements are wanted, and not in locations where they are not wanted. Direct forming process provides "net-shape" manufacturing techniques, as the elements when they are created by the direct forming process are net or near-net dimensions upon their formation. The elements can be assembled to interconnect with one another at substantially the same time that they are formed, thus eliminating interim storage, picking and positioning of elements to form the non-textile fabric structure. Also, in some instances, the final non-textile fabric sheet does not require post forming handling, such as cutting or shearing, prior to further assembly since only the elements needed would be molded and joined at the time of forming. Further, the fit of adjacent and interconnected elements can be made almost perfectly since portions of adjacent, first elements form part of the mold cavity for the subsequent elements.

Of course it should be understood that while some embodiments of the NTF utilize rollers in the creation of the elements, the rollers should be considered examples of manufacturing steps or processes whereby each element could be made by other methods of manufacturing such as by injection molding.

Additionally, the direct forming process can take advantage of engineered thermoplastic compounds. Such higher performance thermoplastics have been impractical for wide spread use in commodity consumer products like luggage, primarily due to such materials' higher per-unit costs. However, because of the very high efficiencies (low scrap rate, brief cycle times, etc.) expected from this novel Direct Forming process, such more expensive materials may come under consideration.

Observations have been made regarding pintle diameter size, and adjustments to the pintle have been made accordingly. The cross-section, shape, nature, and volume of any portion of the elements including the pintle can vary and included within this disclosure are varying diameters of a cylindrical pintle, mold treatment including hand polishing to facilitate rounded corners, and other modifications to the geometry/configuration of the molds. Materials including nylon, Delrin, and nylon enhanced with nanoclay have been used with success.

What is claimed is:

1. A combination of a formed element and another element from which a non-textile fabric can be made from an assemblage of many other such elements, the formed element including an overall triangular shape in plan with three sides, at least one connection structure at each side that permits hinging connection with the other element, each connection structure defining a hinging axis about which the other element may rotate relative to the formed element, the overall triangular shape defined in part by intersecting lines drawn through these hinging axes, buttressing portions near the intersections of these lines, the connection structure including a plurality of hinge knuckles spaced along at least one side of the overall triangular shape, at least one of the plurality of hinge knuckles configured to position the hinging connection with the other element about half way between the intersections along that side, the other element including a central bar portion and a pair of oppositely projecting headed pintles molded at each end thereof, and wherein one pair of oppositely projecting headed pintles is axially positioned between the hinge knuckles, and the central bar portion of the other element is dimensioned to space the pair of oppositely projecting headed pintles at one end of the bar portion from the pair of oppositely projecting headed pintles at the other end of the bar portion so as to permit a second formed element, which is hingedly attached to the other end of the bar portion by the oppositely projecting headed pintles, to fold over onto the formed element.

2. The combination of elements of claim 1 wherein there are at least two such other elements positioned along a side of the formed element.

3. The combination of elements of claim 1 wherein one of at least two such other elements is positioned along a side of the formed element close to one of the intersections.

4. The combination of elements of claim 1 wherein the formed element has a thickness dimension, and the central bar portion of the other element is dimensioned to space the pair of oppositely projecting headed pintles at one end of the bar portion from the pair of oppositely projecting headed pintles at the other end of the bar portion a distance that is equal to or greater than the thickness dimension of the formed element.

* * * * *